United States Patent Office 3,227,113
Patented Jan. 4, 1966

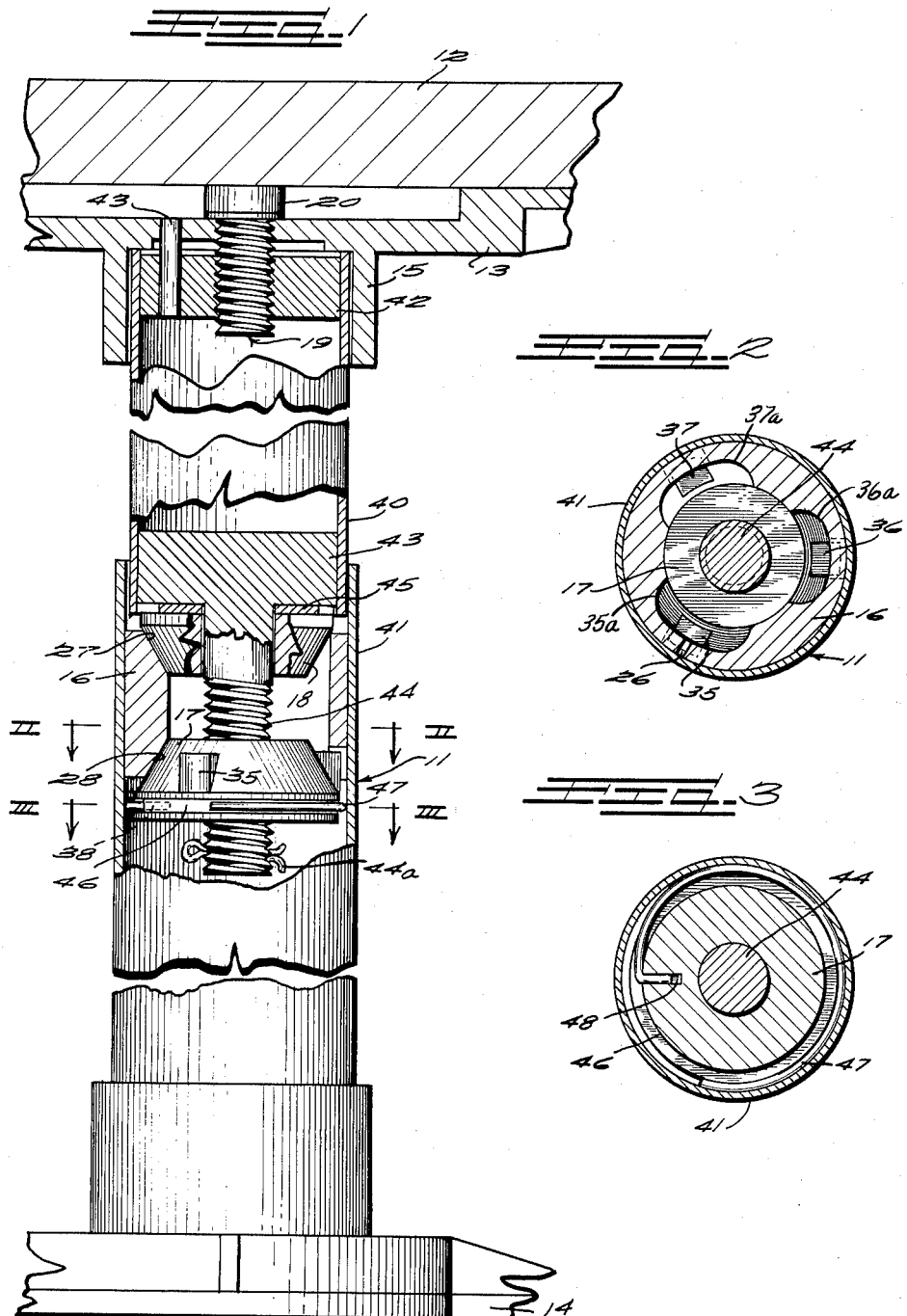

3,227,113
LOCKING MECHANISM
Joseph Kupski, North Chicago, Ill., assignor to The Chicago Hardware Foundry Company, North Chicago, Ill., a corporation of Illinois
Original application Jan. 26, 1962, Ser. No. 169,057, now Patent No. 3,145,669, dated Aug. 25, 1964. Divided and this application Dec. 19, 1963, Ser. No. 331,895
1 Claim. (Cl. 108—148)

This invention relates to a locking mechanism, and more particularly to a locking mechanism for adjustably securing tubular, columnar members together.

This is a division of my application Serial No. 169,057, filed January 26, 1962, now Patent No. 3,145,669.

In the present embodiment of my invention, a locking mechanism is utilized in a pedestal type table or the like having a column which is adjustable in height. The column comprises telescoping tubes, with one tube carrying and the other tube containing the locking mechanism. By operation of the locking mechanism, an expansion ring frictionally engages the other tube to hold the same at any desired height against rotating with respect to the first tube. Thus, a table is provided which can be adjusted from coffee table height to dining table height, or to any position in between. The expansion ring is freely disposed between annular cams, with one cam, when in engagement therewith, angularly fixed relative to the ring and carrying a lock spring so that when the tube carrying the cams is rotated in one direction relative to the other tube, the cams will cause the ring to expand against the outer tube to maintain the tubes or column sections in the desired position or column extension.

It is therefore an object of this invention to provide a locking mechanism as described which can be utilized to adjustably connect a pair of tubes to form a column for a pedestal type table, or like structure, of the desired height.

Another object of the invention is to provide a device as described which elminated loose parts to be shipped and considerably reduces the assembly time for pedestal type tables and like structures.

Other objects and advantages of the invention will become apparent as the description proceeds in accordance with the drawings in which:

FIGURE 1 is an elevational view of a pedestal type table, partly broken away and in section;

FIGURE 2 is a horizontal sectional view taken along the lines II—II of FIGURE 1; and FIGURE 3 is a horizontal sectional view taken along the lines III—III of FIGURE 1.

With reference to the drawings, the invention here shown comprises a table 12 and associated spider 13, mounted for vertical adjustment relative to a base 14 by means of a composite column having an upper section 40 telescoping into a lower section 41. The lower section is secured to said base 14. The upper section 40 is secured to the spider 13 by means of a disk 42 and a headed bolt 19 threaded through the spider into the disk. The head 20 of the bolt is received in a recess formed by the spider so that, for example, the table 12 can be secured to the spider 13 after assembly of the spider on the composite column 11. To prevent relative rotation between the spider and the column section 40, a pin 43 is set in the spider and disk 42.

In order to mount the locking mechanism of my invention to provide selective vertical adjustment and holding of the column 11 in its adjusted position, the lower end of the section 40 has secured therein a disk 43, into which is secured the upper end of a threaded rod 44. The rod 44 has threadedly mounted thereon a plain cone 18, with a washer 45 interposed between the disk 43 and the base of the cone. The cone 18 is normally in seating relation against an upper conical surface 27 formed on an expansion ring 16 which is split, as at 26, and which has a cylindrical outer surface for close-fitting but free positioning relation to the section 41. The locking action is afforded by a drive cone 17 threaded upon the rod 44 and adapted to seat against a lower conical surface 28 on the ring 16, and with respect to which said cone 17 is held against relative rotation by bosses 35, 36 and 37, which correspondingly fit in complementary recesses 35a, 36a and 37a in the ring 16. Thus the cone 17 will move axially along the rod 44 toward the cone 18 when the upper column section 40 is rotated in one direction and away from the cone 18 when rotated in the other direction. It may be noted the rod 44 has a cotter pin 44a to hold the cone 17 from dropping off.

The drive cone 17 is provided with an annular groove 46 which receives a partial circumferential length of spring 47. The spring 47 has an inturned end inserted in the radial recess 48, from which it normally expands away from the cone 17 into contact with the column section 41. It will be seen from viewing FIG. 3, that when the cone 17 is rotated counterclockwise with respect to section 41, the spring will slip against the inner wall of section 41. But upon clockwise rotation, the spring will progressively bind against the wall of section 41, thereby effecting a relative torque on the drive cone 17. Consequently, under this assumed condition, if the upper column section 40 is rotated in a clockwise direction (as viewed from above) the cone 17 will move upwardly along the threaded rod 44 and cam the expansion ring 16 into expanding against the column 41, thereby assuring a positive holding action against axial loads. Reverse rotational movement will release the ring to permit axial adjustment of the column. As previously stated, the lower column section 41 is suitably connected to and secured at the base 14 to hold the column section 41 against rotation with respect to the base. However, either the lower column section or the top section can be rotated relatively to the other section, as may be most convenient in a given installation.

With my locking mechanism, therefore, it is a simple matter to adjust the height of the table top. One merely rotates the table top in the proper direction (clockwise as viewed from above the structure as illustrated in the drawings) to release the locking mechanism. This permits relative axial movement between the column section 40 and 41 by either lifting up on or pushing down on the table top 12. Then, when the height adjustment desired has been made one turns the table top in the other direction (counterclockwise as illustrated) and thereby effects the actuation of the locking mechanism to lock the column sections in their adjusted column-height positions.

It will thus be seen that a simple and effective locking mechanism has been afforded which affords a secure column connection without the need for tie rods such as have been required previously. Further, the invention is effective in permitting an axially adjustable column to be extended or contracted and then locked in adjusted position with a minimum of effort.

I claim as my invention:

In combination with a pedestal type table having relatively rotatable top and base portions, an extensible column joining said top and base portions and including a pair of fully cylindrical telescoping inner and outer tubes, and means fixedly securing the upper end of the inner tube and the lower ends of said outer tube in said top and base portions respectively, a locking mechanism for adjusting the axial extent of said column comprising a threaded rod fixedly secured in the inner one of said telescoping tubes and freely extending into the outer tube, a drive cone threaded on said rod and disposed in said outer tube, an expansion ring keyed in non-rotational relationship to and surrounding said drive cone for expansion into contact with said outer tube, a plain cone received on said rod and within said expansion ring, means limiting axial movement of said plain cone on said rod away from said drive cone, said drive cone, expansion ring and plain cone having complementary cam surfaces engageable so as to cam said expansion ring into locking engagement with said outer tube upon rotation of said table top portion and therefore of said threaded rod in one direction, and resilient means carried by said drive cone and engaging said outer tube so as to exert a progressively binding action against said outer tube to effect relative torque on said drive cone when said table portion is rotated in said one direction and to release such binding action when said table top is rotated in the opposite direction, whereby the axial height of said table top portion can be readily effected by rotation of said table top portion in one direction relative to said base portion to release said locking mechanism and either lifting up or pushing down on said table top while said locking mechanism is so released, and thereafter by rotation of said table top in the opposite direction effecting a locking of said column in its adjusted height position.

References Cited by the Examiner

UNITED STATES PATENTS

| | | |
|---|---|---|
| 2,490,369 | 12/1949 | Neuwirth. |
| 2,508,039 | 5/1950 | Neuwirth. |
| 2,542,967 | 2/1951 | Waechter _____ 248—188.5 |
| 2,567,593 | 9/1951 | Bemis _____ 108—150 X |
| 2,649,345 | 8/1953 | Hubbard _____ 108—144 |
| 2,695,800 | 11/1954 | Soucy _____ 248—58 |
| 3,098,669 | 7/1963 | Fortin et al. _____ 248—58 |
| 3,117,392 | 1/1964 | Junkunc _____ 108—144 X |

CARL W. TOMLIN, *Primary Examiner.*